(12) United States Patent
Ezzat et al.

(10) Patent No.: US 9,090,287 B2
(45) Date of Patent: Jul. 28, 2015

(54) VEHICLE STRUCTURAL SUPPORT MEMBER REINFORCED WITH ULTRA HIGH STRENGTH LAMINATE

(71) Applicants: GM GLOBAL TECHNOLOGY OPERATIONS LLC, Detroit, MI (US); NanoSteel Company, Inc., Providence, RI (US)

(72) Inventors: Hesham A. Ezzat, Troy, MI (US); Charles D Tuffile, Dighton, MA (US); Marcel R. Cannon, Romeo, MI (US)

(73) Assignees: GM Global Technology Operations LLC, Detroit, MI (US); The Nanosteel Company, Inc., Providence, RI (US)

( * ) Notice: Subject to any disclaimer, the term of this patent is extended or adjusted under 35 U.S.C. 154(b) by 5 days.

(21) Appl. No.: 13/740,856

(22) Filed: Jan. 14, 2013

(65) Prior Publication Data
US 2014/0197664 A1 Jul. 17, 2014

(51) Int. Cl.
*B62D 25/00* (2006.01)
*B62D 25/08* (2006.01)
*B62D 29/00* (2006.01)

(52) U.S. Cl.
CPC .............. *B62D 25/00* (2013.01); *B62D 25/087* (2013.01); *B62D 29/005* (2013.01); *B62D 29/007* (2013.01); *Y10T 29/49622* (2015.01)

(58) Field of Classification Search
CPC .... B62D 25/00; B62D 25/087; B62D 29/005; B62D 29/007
USPC .................. 296/203.01, 193.01; 29/897.2
See application file for complete search history.

(56) References Cited

U.S. PATENT DOCUMENTS

| 2005/0048246 A1* | 3/2005 | Westre et al. ............... 428/57 |
| 2013/0106138 A1* | 5/2013 | Brockhoff et al. ....... 296/187.03 |

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A method of manufacturing a structural support member for a vehicle includes forming a first portion, forming a second portion, and connecting the first portion and the second portion together. The first portion and the second portion may be formed from one of an aluminum material, a magnesium material, a cold-formable steel material, a glass fiber composite material, or a plastic material. The first portion and the second portion are connected together such that the second portion is disposed in a tensile loading condition in response to an impact load applied to the first portion. A laminate layer is attached to the second portion. The laminate layer includes an ultra high strength material having a yield strength equal to or greater than five hundred fifty (550) MPa. The laminate layer may include, for example, an iron based glassy metal foil or an iron based glassy metal foil fabric.

31 Claims, 2 Drawing Sheets

VEHICLE STRUCTURAL SUPPORT MEMBER REINFORCED WITH ULTRA HIGH STRENGTH LAMINATE

TECHNICAL FIELD

The invention generally relates to a structural support member for a vehicle that is reinforced with an ultra high strength laminate, and a method of manufacturing the structural support member.

BACKGROUND

Structural support members for a vehicle may include but are not limited to automotive features such as an A-pillar, a B-pillar, a door beam, or a roof rail. In order to reduce the overall mass of the structural support member, a lighter density material may be used, or the cross sectional thickness may be reduced. However, changes to material properties and/or the shape of the structural support member are limited by a required strength and/or stiffness of the structural support member. Accordingly, the structural support members are optimized for gross geometry to provide the required level of strength and/or stiffness while minimizing the overall mass of the structural support member.

SUMMARY

A method of manufacturing a structural support member for a vehicle is provided. The method includes forming a first portion, forming a second portion, and connecting the first portion and the second portion together. The first portion and the second portion are connected together such that the second portion is disposed in a tensile loading condition in response to an impact load applied to the first portion. A laminate layer is attached to the second portion. The laminate layer includes an ultra high strength material having a yield strength equal to or greater than fifteen hundred (1500) MPa.

A method of manufacturing a structural support member that is optimized for gross geometry and minimal mass is also provided. The method includes forming a first portion and forming a second portion. The first portion and the second portion are each formed from one of an aluminum material, a magnesium material, a cold-formable steel material, a glass fiber composite material, or a plastic material. The first portion and the second portion are connected together such that the second portion is disposed in a tensile loading condition in response to an impact load applied to the first portion. A laminate layer is attached to the second portion. The laminate layer includes an ultra high strength material having a yield strength equal to or greater than fifteen hundred (1500) MPa. The specific material used to form the first portion and the second portion, and a cross sectional shape and thickness of the first portion and the second portion respectively, is dependent upon the tensile load carrying capacity of the laminate layer.

A structural support member for a vehicle is also provided. The structural support member includes a first portion and a second portion attached to the first portion. The second portion is disposed in a tensile loading condition in response to an impact load applied to the first portion. A laminate layer is attached to the second portion. The laminate layer includes an ultra high strength material having a yield strength equal to or greater than fifteen hundred (1500) MPa.

Accordingly, the laminate layer is added to the second portion of the structural support member, which is the portion that is placed in the tensile loading condition when an impact load is applied to the first portion. The laminate layer is an ultra high strength material having a high tensile strength capable of a high tensile load bearing capacity. Because the laminate layer may carry much of the resultant tensile load caused by the impact load, the required strength and/or stiffness requirements of the first portion and the second portion of the structural support member may be reduced. Because the required strength and/or stiffness of the first portion and the second portion is reduced, the materials used for and/or the geometric configuration, such as a cross sectional thickness, of the first portion and the second portion may be altered to minimize the overall mass of the structural support member.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
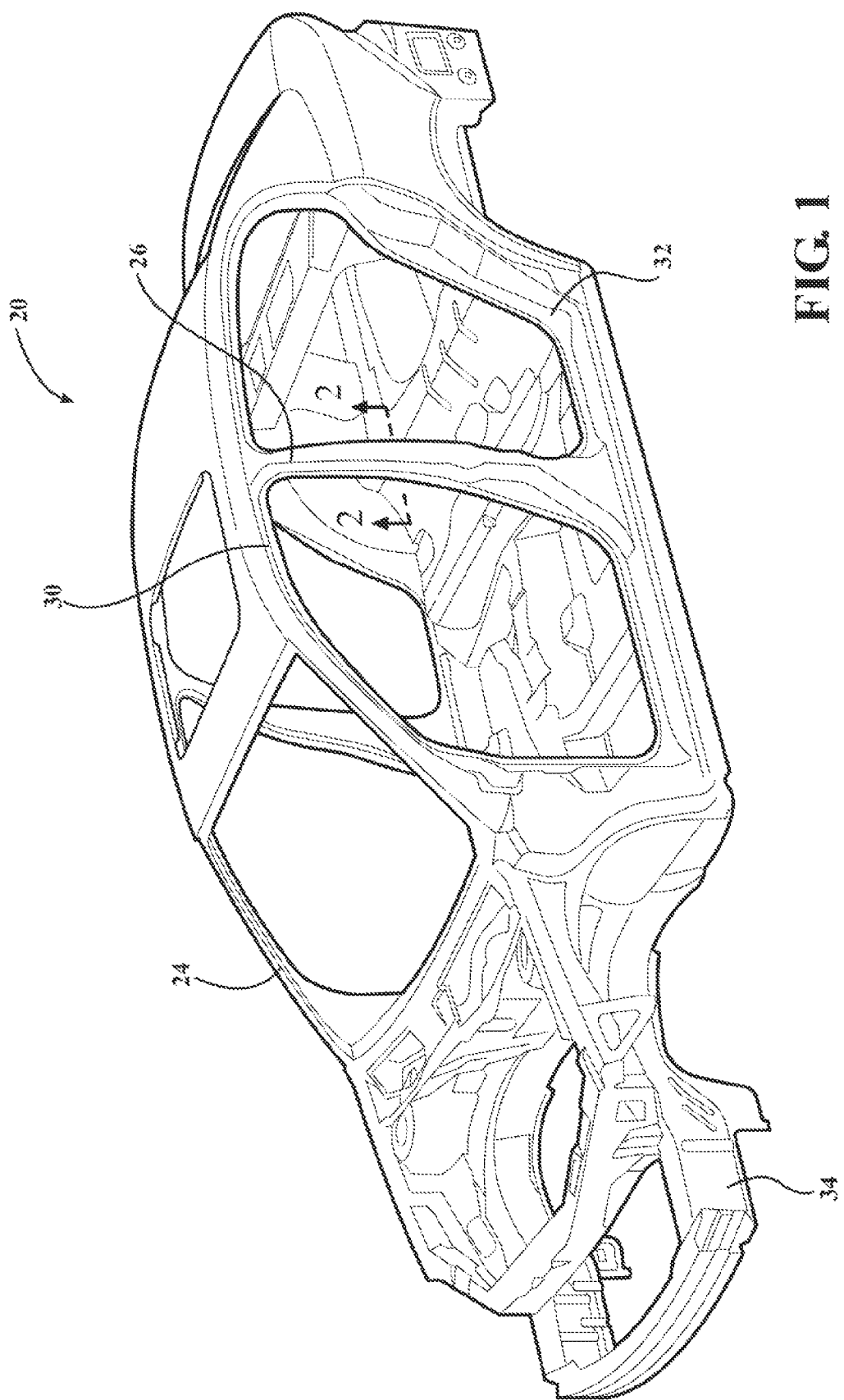
FIG. 1 is a schematic perspective view of a vehicle.

Referring to the Figures, wherein like numerals indicate like parts throughout the several views, a vehicle is generally shown at 20. Referring to FIG. 1, the vehicle includes at least one structural support member, generally shown at 22 in FIG. 2. The structural support member 22 may include but is not limited to an A-pillar 24, a B-pillar 26, a roof rail 30, a rocker panel support 32, a frame member 34, a hinge pillar (not shown) or a door beam support (not shown).

Figure 2:
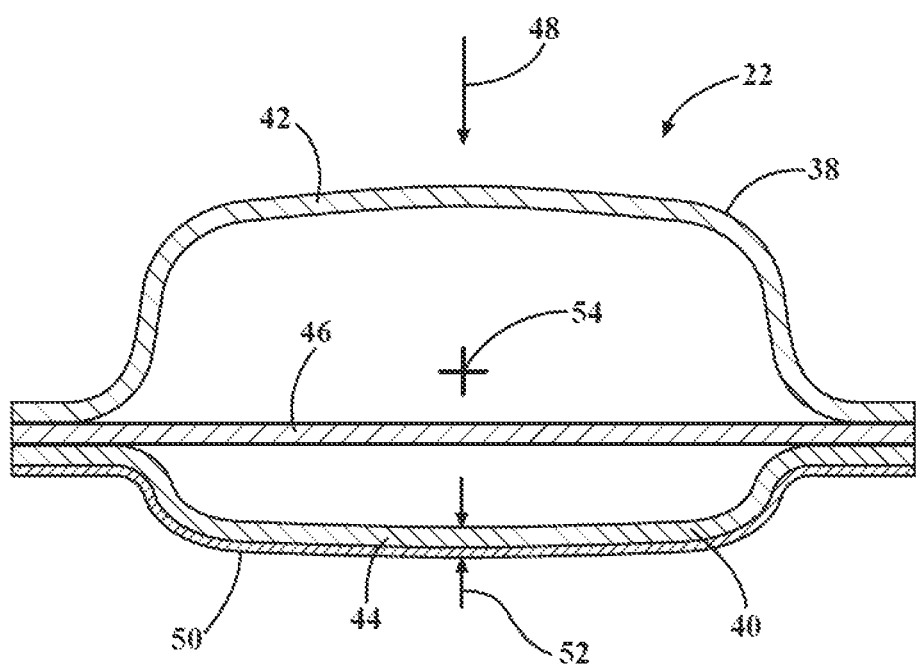
FIG. 2 is a schematic cross sectional view of a structural support member for the vehicle.

Referring to FIG. 2, the structural support member 22 is shown as a B-pillar 26 of the vehicle 20 in cross section. As shown in FIG. 2, the structural support member 22 includes at least a first portion 38 and a second portion 40. The first portion 38 may include either of an outer member 42 or an inner member 44, and the second portion 40 may include the other of the outer member 42 and the inner member 44. As shown in FIG. 2, the first portion 38 is defined and shown as the outer member 42, and the second portion 40 is defined and shown as the inner member 44. The structural support member 22 may further include, but is not required to include, an internal tensile member 46. The tensile member 46 is disposed between and interconnects the outer member 42 and the inner member 44.

The first portion 38 and the second portion 40 are attached together, and may each include and be manufactured from one of an aluminum material, a magnesium material, a cold-formable steel material, a glass fiber composite material, or a plastic material. The first portion 38 and the second portion 40 may each be manufactured from the same material. Alternatively, the first portion 38 and the second portion 40 may each include and be manufactured from different materials. The first portion 38 and the second portion 40 may be attached to each other in any suitable manner, including but not limited to welding the first portion 38 and the second portion 40 together, bonding or adhering the first portion 38 and the second portion 40 together, forming a hem connection to connect the first portion 38 and the second portion 40, or connecting the first portion 38 and the second portion 40 in some other manner not described herein.

The second portion 40 is positioned relative to the first portion 38 so that the second portion 40 is disposed in a tensile loading condition in response to an impact load, generally indicated by arrow 48, being applied to the first portion 38. Accordingly, it should be appreciated that if the impact load 48 were applied to the inner member 44, then the inner member 44 would be defined as the first portion, and the outer member 42 would be defined as the second portion.

A laminate layer 50 is attached to the second portion 40, which is a portion of the structural support member 22 that is placed in the tensile loading condition in response to the impact load 48. The laminate layer 50 includes an ultra high strength material having a yield strength preferably equal to or greater than fifteen hundred (1500) MPa. For example, the laminate layer 50 may include but is not limited to one of an iron based glassy metal foil, an iron based glassy metal foil fabric, or a fiber or iron based glassy metal foil reinforced polymer.

The iron based glassy metal foil fabric includes ribbons of the iron based glassy metal foil cut to approximate widths between the range of 0.25 mm and 100 mm. The ribbons of the iron based glassy metal foil are then woven together to form the iron based glassy metal foil fabric.

The iron based glassy metal foil herein may be understood to preferably include those glass forming chemistries that lead to the development of Spinodal Glass Matrix Microconstituents (SGMM) structures, which may exhibit relatively significant ductility and high tensile strength. Spinodal glass matrix microconstituents may be understood as microconstituents (i.e., crystalline or glass phases) that are formed by a transformation mechanism that is not nucleation controlled. More basically, spinodal decomposition may be understood as a mechanism by which a solution of two or more components (e.g., metal compositions) of the alloy can separate into distinct regions (or phases) with distinctly different chemical compositions and physical properties. This mechanism differs from classical nucleation in that phase separation occurs uniformly throughout the material and not just at discrete nucleation sites. The phases may include one or more semi-crystalline clusters or crystalline phases, which may therefore form through a successive diffusion of atoms on a local level until the chemistry fluctuations lead to at least one distinct crystalline phase. Semi-crystalline clusters may be understood herein as exhibiting a largest linear dimension of 2 nm or less, where as crystalline clusters may exhibit a largest linear dimension of greater than 2 nm. Note that during the early stages of spinodal decomposition, the clusters which are formed may be relatively small and while their chemistry differs from a surrounding glass matrix, they are not yet fully crystalline and have not yet achieved well ordered crystalline periodicity. Additional crystalline phases may exhibit the same crystal structure or distinct structures. Furthermore, as noted the phases may include a glass matrix. The glass matrix may be understood to include microstructures that may exhibit associations of structural units in the solid phase that may be randomly packed together. The level of refinement, or the size, of the structural units in the glass phase may be in the angstrom scale range, i.e., 5 Å to 100 Å.

Spinodal glass matrix microconstituent formation is quite different than the devitrification of a metallic glass. Metallic glasses may exhibit characteristics which are both metal like, (since they may contain non-directional metallic bonds, metallic luster, and relatively significant electrical and thermal conductivity), and ceramic like (since relatively high hardness may often be exhibited coupled with brittleness and the lack of tensile ductility). Metallic glasses may be understood to include supercooled liquids that exist in solid form at room temperature but which may have structures that are similar to what is found in the liquid with only short range order present. Metallic glasses may generally have free electrons, exhibit metallic luster, and exhibit metallic bonding similar to what is found in conventional metals. Metallic glasses may be understood to be metastable materials and when heated up, they may transform into a crystalline state through crystallization or devitrification. Since diffusion may be limited at room temperature, enough heat (i.e. Boltzman's Energy) may be to be applied to overcome the nucleation barrier to cause a solid-solid state transformation which is caused by glass devitrification.

The alloys leading to the Spinodal Glass Matrix Microconstituent structures preferred herein may exhibit induced Shear Band Blunting (ISBB) and Shear Band Arresting Interactions (SBAI) which may be enabled by the spinodal glass matrix microconstituent (SGMM). ISBB may be understood as the ability to blunt and stop propagating shear bands through interactions with the SGMM structure. SBAI may be understood as the arresting of shear bands through shear band/shear band interactions and may occur after the initial or primary shear bands are blunted through ISBB.

While conventional materials may deform through dislocations moving on specific slip systems in crystalline metals, ISBB and SBAI deformation mechanisms may involve moving shear bands (i.e., discontinuities where localized deformation occurs) in a spinodal glass matrix microconstituent, which are blunted by localized deformation induced changes (LDIC) described further herein. With increasing levels of stress, once a shear band is blunted, new shear bands may be nucleated and then interact with existing shear bands creating relatively high shear band densities in tension and the development of relatively significant levels of global plasticity. Thus, the alloys with favorable SGMM structures may prevent or mitigate shear band propagation in tension, which may result in relatively significant tensile ductility (>1%) and lead to strain hardening during tensile testing. The alloys contemplated herein may include or consist of chemistries capable of forming a spinodal glass matrix microconstituent, wherein the spinodal glass matrix microconstituents may be present in the range of 5.0% to 95% by volume, including glassy, semi-crystalline, and/or crystalline phases.

Glass forming chemistries that may be used to form compositions including the spinodal glass matrix microconstituent structures may include certain iron based glass forming alloys, which are then processed to provide the SGMM structures noted herein. The iron based alloys may include iron present at levels of greater than or equal to 45 atomic %. In addition, the alloys may include the elements nickel, boron, silicon and optionally chromium. In some embodiments, the alloys may consist essentially of or may be limited only to iron, nickel, boron, silicon and optionally chromium. In further embodiments, the alloys do not include cobalt, which would otherwise increase the relative cost of the alloy compositions.

In some embodiments, the alloys may include iron present in the range of 45 atomic percent to 71 atomic percent, nickel present in the range of 4 atomic percent to 17.5 atomic percent, boron present in the range of 11 atomic percent to 16 atomic percent, silicon present in the range of 0.3 atomic percent to 4.0 atomic percent and optionally chromium present in the range of 0.1 atomic percent to 19 atomic percent. The compositions of the alloys may vary at all values and increments in the above described ranges.

Therefore, iron may be selected from the following values of 45.0 atomic percent (at. %), 45.1 at. %, 45.2 at. %, 45.3 at. %, 45.4 at. %, 45.6 at. %, 45.7 at. %, 45.8 at. %, 45.9 at. %, 46.0 at. %, 46.1 at. %, 46.2 at. %, 46.3 at. %, 46.4 at. %, 46.5 at. %, 46.7 at. %, 46.8 at. %, 46.9 at. %, 47.0 at. %, 47.1 at. %, 47.2 at. %, 47.3 at. %, 47.4 at. %, 47.5 at. %, 47.6 at. %, 47.7 at. %, 47.8 at. %, 47.9 at. %, 48 at. %, 48.1 at. %, 48.2 at. %, 48.3 at. %, 48.4 at. %, 48.5 at. %, 48.6 at. %, 48.7 at. %, 48.8 at. %, 48.9 at. %, 49 at. %, 49.1 at. %, 49.2 at. %, 49.3 at. %, 49.4 at. %, 49.5 at. %, 49.6 at. %, 49.7 at. %, 49.8 at. %, 49.9 at. %, 50 at. %, 50.1 at. %, 50.2 at. %, 50.3 at. %, 50.4 at. %, 50.5 at. %, 50.6 at. %, 50.7 at. %, 50.8 at. %, 50.9 at. %, 51 at. %, 51.1 at. %, 51.2 at. %, 51.3 at. %, 51.4 at. %, 51.5 at. %, 51.6 at. %, 51.7 at. %, 51.8 at. %, 51.9 at. %, 52 at. %, 52.1 at. %, 52.2 at. %, 52.3 at. %, 52.4 at. %, 52.5 at. %, 52.6 at. %, 52.7 at. %, 52.8 at. %, 52.9 at. %, 53 at. %, 53.1 at. %, 53.2 at. %, 53.3 at. %, 53.4 at. %, 53.5 at. %, 53.6 at. %, 53.7 at. %, 53.8 at. %, 53.9 at. %, 54 at. %, 54.1 at. %, 54.2 at. %, 54.3 at. %, 54.4 at. %, 54.5 at. %, 54.6 at. %, 54.7 at. %, 54.8 at. %, 54.9 at. %, 55 at. %, 55.1 at. %, 55.2 at. %, 55.3 at. %, 55.4 at. %, 55.5 at. %, 55.6 at. %, 55.7 at. %, 55.8 at. %, 55.9 at. %, 56 at. %, 56.1 at. %, 56.2 at. %, 56.3 at. %, 56.4 at. %, 56.5 at. %, 56.6 at. %, 56.7 at. %, 56.8 at. %, 56.9 at. %, 57 at. %, 57.1 at. %, 57.2 at. %, 57.3 at. %, 57.4 at. %, 57.5 at. %, 57.6 at. %, 57.7 at. %, 57.8 at. %, 57.9 at. %, 58 at. %, 58.1 at. %, 58.2 at. %, 58.3 at. %, 58.4 at. %, 58.5 at. %, 58.6 at. %, 58.7 at. %, 58.8 at. %, 58.9 at. %, 59 at. %, 59.1 at. %, 59.2 at. %, 59.3 at. %, 59.4 at. %, 59.5 at. %, 59.6 at. %, 59.7 at. %, 59.8 at. %, 59.9 at. %, 60 at. %, 60.1 at. %, 60.2 at. %, 60.3 at. %, 60.4 at. %, 60.5 at. %, 60.6 at. %, 60.7 at. %, 60.8 at. %, 60.9 at. %, 61 at. %, 61.1 at. %, 61.2 at. %, 61.3 at. %, 61.4 at. %, 61.5 at. %, 61.6 at. %, 61.7 at. %, 61.8 at. %, 61.9 at. %, 62 at. %, 62.1 at. %, 62.2 at. %, 62.3 at. %, 62.4 at. %, 62.5 at. %, 62.6 at. %, 62.7 at. %, 62.8 at. %, 62.9 at. %, 63 at. %, 63.1 at. %, 63.2 at. %, 63.3 at. %, 63.4 at. %, 63.5 at. %, 63.6 at. %, 63.7 at. %, 63.8 at. %, 63.9 at. %, 64 at. %, 64.1 at. %, 64.2 at. %, 64.3 at. %, 64.4 at. %, 64.5 at. %, 64.6 at. %, 64.7 at. %, 64.8 at. %, 64.9 at. %, 65 at. %, 65.1 at. %, 65.2 at. %, 65.3 at. %, 65.4 at. %, 65.5 at. %, 65.6 at. %, 65.7 at. %, 65.8 at. %, 65.9 at. %, 66 at. %, 66.1 at. %, 66.2 at. %, 66.3 at. %, 66.4 at. %, 66.5 at. %, 66.6 at. %, 66.7 at. %, 66.8 at. %, 66.9 at. %, 67 at. %, 67.1 at. %, 67.2 at. %, 67.3 at. %, 67.4 at. %, 67.5 at. %, 67.6 at. %, 67.7 at. %, 67.8 at. %, 67.9 at. %, 68 at. %, 68.1 at. %, 68.2 at. %, 68.3 at. %, 68.4 at. %, 68.5 at. %, 68.6 at. %, 68.7 at. %, 68.8 at. %, 68.9 at. %, 69 at. %, 69.1 at. %, 69.2 at. %, 69.3 at. %, 69.4 at. %, 69.5 at. %, 69.6 at. %, 69.7 at. %, 69.8 at. %, 69.9 at. %, 70 at. %, 70.1 at. %, 70.2 at. %, 70.3 at. %, 70.4 at. %, 70.5 at. %, 70.6 at. %, 70.7 at. %, 70.8 at. %, 70.9 at. %, and/or 71 at. %.

Nickel may be selected from the following values of 4.0 at. %, 4.1 at. %, 4.2 at. %, 4.3 at. %, 4.4 at. %, 4.5 at. %, 4.6 at. %, 4.7 at. %, 4.8 at. %, 4.9 at. %, 5 at. %, 5.1 at. %, 5.2 at. %, 5.3 at. %, 5.4 at. %, 5.5 at. %, 5.6 at. %, 5.7 at. %, 5.8 at. %, 5.9 at. %, 6 at. %, 6.1 at. %, 6.2 at. %, 6.3 at. %, 6.4 at. %, 6.5 at. %, 6.6 at. %, 6.7 at. %, 6.8 at. %, 6.9 at. %, 7 at. %, 7.1 at. %, 7.2 at. %, 7.3 at. %, 7.4 at. %, 7.5 at. %, 7.6 at. %, 7.7 at. %, 7.8 at. %, 7.9 at. %, 8 at. %, 8.1 at. %, 8.2 at. %, 8.3 at. %, 8.4 at. %, 8.5 at. %, 8.6 at. %, 8.7 at. %, 8.8 at. %, 8.9 at. %, 9 at. %, 9.1 at. %, 9.2 at. %, 9.3 at. %, 9.4 at. %, 9.5 at. %, 9.6 at. %, 9.7 at. %, 9.8 at. %, 9.9 at. %, 10 at. %, 10.1 at. %, 10.2 at. %, 10.3 at. %, 10.4 at. %, 10.5 at. %, 10.6 at. %, 10.7 at. %, 10.8 at. %, 10.9 at. %, 11 at. %, 11.1 at. %, 11.2 at. %, 11.3 at. %, 11.4 at. %, 11.5 at. %, 11.6 at. %, 11.7 at. %, 11.8 at. %, 11.9 at. %, 12 at. %, 12.1 at. %, 12.2 at. %, 12.3 at. %, 12.4 at. %, 12.5 at. %, 12.6 at. %, 12.7 at. %, 12.8 at. %, 12.9 at. %, 13 at. %, 13.1 at. %, 13.2 at. %, 13.3 at. %, 13.4 at. %, 13.5 at. %, 13.6 at. %, 13.7 at. %, 13.8 at. %, 13.9 at. %, 14 at. %, 14.1 at. %, 14.2 at. %, 14.3 at. %, 14.4 at. %, 14.5 at. %, 14.6 at. %, 14.7 at. %, 14.8 at. %, 14.9 at. %, 15 at. %, 15.1 at. %, 15.2 at. %, 15.3 at. %, 15.4 at. %, 15.5 at. %, 15.6 at. %, 15.7 at. %, 15.8 at. %, 15.9 at. %, 16.0 at. %, 16.1 at. %, 16.2 at. %, 16.3 at. %, 16.4 at. %, 16.5. at. %, 16.6 at. %, 16.7. at. %, 16.8 at. %, 16.9 at. %, 17.0 at. %, 17.1 at. %, 17.2 at. %, 17.3 at. %, 17.4 at. %, 17.5 at. %.

Boron may be selected from the following values of 11.0 at. %, 11.1 at. %, 11.2 at. %, 11.3 at. %, 11.4 at. %, 11.5 at. %, 11.6 at. %, 11.7 at. %, 11.8 at. %, 11.9 at. %, 12 at. %, 12.1 at. %, 12.2 at. %, 12.3 at. %, 12.4 at. %, 12.5 at. %, 12.6 at. %, 12.7 at. %, 12.8 at. %, 12.9 at. %, 13 at. %, 13.1 at. %, 13.2 at. %, 13.3 at. %, 13.4 at. %, 13.5 at. %, 13.6 at. %, 13.7 at. %, 13.8 at. %, 13.9 at. %, 14 at. %, 14.1 at. %, 14.2 at. %, 14.3 at. %, 14.4 at. %, 14.5 at. %, 14.6 at. %, 14.7 at. %, 14.8 at. %, 14.9 at. %, 15 at. %, 15.1 at. %, 15.2 at. %, 15.3 at. %, 15.4 at. %, 15.5 at. %, 15.6 at. %, 15.7 at. %, 15.8 at. %, 15.9 at. %, 16 at. %.

Silicon may be selected from the following values of 0.3 at. %, 0.4 at. %, 0.5 at. %, 0.6 at. %, 0.7 at. %, 0.8 at. %, 0.9 at. %, 1.0 at. %, 1.1 at. %, 1.2 at. %, 1.3 at. %, 1.4 at. %, 1.5 at. %, 1.6 at. 5, 1.7 at. %, 1.8 at. %, 1.9 at. %, 2.0 at. %, 2.1 at. %, 2.2 at. %, 2.3 at. %, 2.4 at. %, 2.5 at. %, 2.6 at. %, 2.7 at. %, 2.8 at. %, 2.9 at. % 3.0 at. %, 3.1 at. %, 3.2 at. %, 3.3 at. %, 3.4 at. %, 3.5 at. %, 3.6 at. %, 3.7 at. %, 3.8 at. %, 3.9 at. % 4.0 at. %.

Chromium may be selected from the following values of 0 at. %, 0.1 at. %, 0.2 at. %, 0.3 at. %, 0.4 at. %, 0.5 at. %, 0.6 at. %, 0.7 at. %, 0.8 at. %, 0.9 at. %, 1 at. %, 1.1 at. %, 1.2 at. %, 1.3 at. %, 1.4 at. %, 1.5 at. %, 1.6 at. %, 1.7 at. %, 1.8 at. %, 1.9 at. %, 2 at. %, 2.1 at. %, 2.2 at. %, 2.3 at. %, 2.4 at. %, 2.5 at. %, 2.6 at. %, 2.7 at. %, 2.8 at. %, 2.9 at. %, 3 at. %, 3.1 at. %, 3.2 at. %, 3.3 at. %, 3.4 at. %, 3.5 at. %, 3.6 at. %, 3.7 at. %, 3.8 at. %, 3.9 at. %, 4 at. %, 4.1 at. %, 4.2 at. %, 4.3 at. %, 4.4 at. %, 4.5 at. %, 4.6 at. %, 4.7 at. %, 4.8 at. %, 4.9 at. %, 5 at. %, 5.1 at. %, 5.2 at. %, 5.3 at. %, 5.4 at. %, 5.5 at. %, 5.6 at. %, 5.7 at. %, 5.8 at. %, 5.9 at. %, 6 at. %, 6.1 at. %, 6.2 at. %, 6.3 at. %, 6.4 at. %, 6.5 at. %, 6.6 at. %, 6.7 at. %, 6.8 at. %, 6.9 at. %, 7 at. %, 7.1 at. %, 7.2 at. %, 7.3 at. %, 7.4 at. %, 7.5 at. %, 7.6 at. %, 7.7 at. %, 7.8 at. %, 7.9 at. %, 8 at. %, 8.1 at. %, 8.2 at. %, 8.3 at. %, 8.4 at. %, 8.5 at. %, 8.6 at. %, 8.7 at. %, 8.8 at. %, 8.9 at. %, 9 at. %, 9.1 at. %, 9.2 at. %, 9.3 at. %, 9.4 at. %, 9.5 at. %, 9.6 at. %, 9.7 at. %, 9.8 at. %, 9.9 at. %, 10 at. %, 10.1 at. %, 10.2 at. %, 10.3 at. %, 10.4 at. %, 10.5 at. %, 10.6 at. %, 10.7 at. %, 10.8 at. %, 10.9 at. %, 11 at. %, 11.1 at. %, 11.2 at. %, 11.3 at. %, 11.4 at. %, 11.5 at. %, 11.6 at. %, 11.7 at. %, 11.8 at. %, 11.9 at. %, 12 at. %, 12.1 at. %, 12.2 at. %, 12.3 at. %, 12.4 at. %, 12.5 at. %, 12.6 at. %, 12.7 at. %, 12.8 at. %, 12.9 at. %, 13 at. %, 13.1 at. %, 13.2 at. %, 13.3 at. %, 13.4 at. %, 13.5 at. %, 13.6 at. %, 13.7 at. %, 13.8 at. %, 13.9 at. %, 14 at. %, 14.1 at. %, 14.2 at. %, 14.3 at. %, 14.4 at. %, 14.5 at. %, 14.6 at. %, 14.7 at. %, 14.8 at. %, 14.9 at. %, 15 at. %, 15.1 at. %, 15.2 at. %, 15.3 at. %, 15.4 at. %, 15.5 at. %, 15.6 at. %, 15.7 at. %, 15.8 at. %, 15.9 at. %, 16 at. %, 16.1 at. %, 16.2 at. %, 16.3 at. %, 16.4 at. %, 16.5 at. %, 16.6 at. %, 16.7 at. %, 16.8 at. %, 16.9 at. %, 17 at. %, 17.1 at. %, 17.2 at. %, 17.3 at. %, 17.4 at. %, 17.5 at. %, 17.6 at. %, 17.7 at. %, 17.8 at. %, 17.9 at. %, 18 at. %, 18.1 at. %, 18.2 at. %, 18.3 at. %, 18.4 at. %, 18.5 at. %, 18.6 at. %, 18.7 at. %, 18.8 at. %, 18.9 at. %, and/or 19 at. %.

In addition, due to, for example, the purity of the feedstocks and introduction of impurities during processing, the iron based alloy foils herein used for laminate layer 50 may include up to 10 atomic percent of impurities. Therefore, the above described iron based alloy composition may be present in the range of 90 to 100 atomic percent of a given composition, including all values and increments therein, such as in the range of 90 to 99 atomic percent, etc.

The iron based metal foil herein may be formed using techniques that may result in cooling rates sufficient to provide SGMM structure, which may be in the range of $10^3$ to $10^6$ K/s. Examples of such processing techniques may include melt-spinning/jet casting, planar flow casting, and twin roll casting. The foils may have a density of 7.40 g/cm$^3$ to 7.80 g/cm$^3$, a glass to crystalline transformation temperature in the range of approximately 396° C. to 713° C., including all values and ranges therein, when measured by differential thermal analysis (DTA) or differential scanning calorimetry (DSC) at a heating rate of 10° C./minute. The enthalpy of transformation may be in the range of −16 J/gram to −167 J/gram, including all values and increments therein, when measured by differential thermal analysis (DTA) or differential scanning calorimetry (DSC) at a heating rate of 10° C./minute. The alloys may exhibit an ultimate tensile strength in the range of 0.4 GPa to 3.90 GPa and elongation in the range of 0.4% to 5.5% and a Vickers hardness in the range of 850 to 950 when tested with a diamond pyramid indenter using a 50 g load.

The second portion 40 and the laminate layer 50 may include a combined cross sectional thickness 52 that will represent the absolute minimum thickness required for the intended application, which may be in the range of 0.5 mm to 2.5 mm. It should be appreciated that the tensile load bearing capacity of the laminate layer 50 increases as the cross sectional area of the laminate layer 50, as determined by a cross sectional width of the laminate layer 50 multiplied by the cross sectional thickness of the laminate layer 50, increases. Accordingly, the cross sectional width and thickness of the laminate layer 50 will depend upon the specific material and corresponding yield strength used for the laminate layer 50, and the tensile load caused by the impact load 48 that the structural support member 22 must resist.

As shown in FIG. 2, the inner member 44 and the outer member 42 each include a cross sectional shape that is designed to increase the bending strength of the structural support member 22 in a plane disposed perpendicular with the cross sectional view of FIG. 2. As is known, when attached together, the inner member 44, the outer member 42 and the tensile member 46 cooperate to define a center of inertia 54. Assuming the structural support member 22 is supported at each axial end of the structural support member 22 and the impact load 48 is applied to the structural support member 22 at a location between the axial ends of the structural support member 22, any portion of the structural support member 22 that is laterally offset from the center of inertia 54 and disposed opposite the impact load 48 across the center of inertia 54 will be placed in the tensile loading condition in response to the impact load 48. Accordingly, as shown in FIG. 2, both the inner member 44 and the tensile member 46 are placed in the tensile loading condition in response to the impact load 48. Therefore, although not specifically shown in the drawings, it is contemplated that the laminate layer 50 may be attached to the tensile member 46, in which case the outer member 42 may be defined as the first portion, and the tensile member 46 would be defined as the second portion, which is a portion of the structural support member 22 that is disposed in the tensile loading condition in response to the impact load 48.

The structural support member 22 may be manufactured by forming the first portion 38, and then forming the second portion 40. As noted above, the first portion 38 and the second portion 40 may each be formed from one of, but not limited to, an aluminum material, a magnesium material, a cold-formable steel material, a glass fiber composite material, or a plastic material. Forming the first portion 38 and forming the second portion 40 includes selecting a specific material for, and defining a cross sectional shape of the first portion 38 and the second portion 40 respectively, based upon the tensile load carrying capacity of the laminate layer 50. Accordingly, the cross sectional shape and material properties of the first portion 38 and the second portion 40, i.e., the inner member 44 and the outer member 42, as well as the tensile member 46, may be selected and/or designed in order to minimize an overall mass of the structural support member 22. For example, the cross sectional thickness of the inner member 44 and/or the outer member 42 may be reduced because of the tensile bearing capacity of the laminate layer 50, or a less dense material may be used for one or both of the inner member 44 and the outer member 42 because of the tensile bearing capacity of the laminate layer 50.

Once the first portion 38 and the second portion 40 are formed, the laminate layer 50 may be attached to the second portion 40, i.e., the portion of the structural support member 22 that is disposed in the tensile loading condition in response to the impact load 48. As noted above, the laminate layer 50 includes an ultra high strength material having a yield strength equal to or greater than fifteen hundred (1500) MPa. It should be appreciated that the overall tensile load bearing capacity of the laminate layer 50 is dependent upon the cross sectional area of the laminate layer 50. Because the laminate layer 50 is only intended to resist the tensile loading caused in the structural support member 22 in response to the impact load 48, and is not intended to resist significant compressive forces, the cross sectional area of the laminate layer 50 may remain relatively small, thereby reducing the overall mass of the structural support member 22.

The laminate layer 50 may be attached to the second portion 40 in any suitable manner. For example, the laminate layer 50 may be welded to the second portion 40, bonded or adhered to the second portion 40, or the laminate layer 50 may be mechanically locked to the second portion 40. Possible methodologies to attach the laminate layer 50 to the second portion 40 may include, but are not limited to, adhesively bonding or welding the laminate layer 50 onto the second portion 40, and then subsequently forming the laminate layer 50 and the second portion 40 together simultaneously in a stamping operation, or laminating or adhesively bonding, welding, or mechanically joining using rivets, bolts, or a compression fitting to attach the laminate layer 50 onto the surface of a pre-formed second portion 40 to reinforce the second portion 40. It should be appreciated that the manner in which the laminate layer 50 is attached to the second portion 40 depends upon the specific materials selected for the second portion 40 and the laminate layer 50, and may differ from the few exemplary attachment procedures noted above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A method of manufacturing a structural support member for a vehicle, the method comprising:
    forming a first portion having an interior surface and an exterior surface;
    forming a second portion having an interior surface and an exterior surface;

connecting the first portion and the second portion together; and attaching a laminate layer directly to the exterior surface of the second portion, wherein the laminate layer includes an ultra high strength material having a yield strength equal to or greater than fifteen hundred (1500) MPa, and wherein the laminate layer includes one of an iron based glassy metal foil, an iron based glassy metal foil fabric, or a fiber or iron based glassy metal foil reinforced polymer.

2. A method as set forth in claim 1 wherein connecting the first portion and the second portion together is further defined as connecting the first portion and the second portion together such that the second portion is disposed in a tensile loading condition in response to an impact load applied to the first portion.

3. A method as set forth in claim 1 wherein the structural support member is one of an automotive A-pillar, an automotive B-pillar, an automotive hinge pillar, an automotive roof rail, an automotive rocker panel support, an automotive frame member, or an automotive door beam support.

4. A method as set forth in claim 1 wherein the laminate layer may be attached to the second portion by one of a welding process, a bonding or adhesion process, or a mechanical joining process.

5. A method as set forth in claim 1 wherein forming the first portion is further defined as forming the first portion from one of an aluminum material, a magnesium material, a cold-formable steel material, a glass fiber composite material, or a plastic material.

6. A method as set forth in claim 1 wherein forming the second portion is further defined as forming the second portion from one of an aluminum material, a magnesium material, a cold-formable steel material, a glass fiber composite material, or a plastic material.

7. A method as set forth in claim 1 wherein forming the first portion and forming the second portion includes selecting a specific material for and defining a cross sectional thickness of the first portion and the second portion respectively based upon the tensile load carrying capacity of the laminate layer, to minimize an overall mass of the structural support member.

8. A method of manufacturing a structural support member that is optimized for gross geometry and minimal mass, the method comprising:

forming a first portion to include an interior surface and an exterior surface, from one of an aluminum material, a magnesium material, a cold-formable steel material, a glass fiber composite material, or a plastic material;

forming a second portion to include an interior surface and an exterior surface, from one of an aluminum material, a magnesium material, a cold-formable steel material, a glass fiber composite material, or a plastic material;

connecting the first portion and the second portion together such that the second portion is disposed in a tensile loading condition in response to an impact load applied to the first portion; and attaching a laminate layer directly to the exterior surface of the second portion, wherein the laminate layer includes an ultra high strength material having a yield strength equal to or greater than fifteen hundred (1500) MPa, and wherein the laminate layer includes one of an iron based glassy metal foil, an iron based glassy metal foil fabric, or a fiber or iron based glassy metal foil reinforced polymer.

9. A method as set forth in claim 8 wherein the structural support member is one of an automotive A-pillar, an automotive B-pillar, an automotive hinge pillar, an automotive roof rail, an automotive rocker panel support, an automotive frame member, or an automotive door beam support.

10. A method as set forth in claim 8 wherein the laminate layer may be attached to the second portion by one of a welding process, a bonding or adhesion process, or a mechanical joining process.

11. A structural support member for a vehicle, the structural support member comprising:

a first portion having an interior surface and an exterior surface;

a second portion, having an interior surface and an exterior surface, and attached to the first portion, wherein the second portion is disposed in a tensile loading condition in response to an impact load applied to the first portion; and a laminate layer directly attached to the exterior surface of the second portion, wherein the laminate layer includes an ultra high strength material having a yield strength equal to or greater than fifteen hundred (1500) MPa, and wherein the laminate layer includes one of an iron based glassy metal foil, an iron based glassy metal foil fabric, or a fiber or iron based glassy metal foil reinforced polymer.

12. A structural support member as set forth in claim 11 wherein the first portion and the second portion are each manufactured from and include one of an aluminum material, a magnesium material, a cold-formable steel material, a glass fiber composite material, or a plastic material.

13. A structural support member as set forth in claim 11 wherein the second portion and the laminate layer include a combined cross sectional thickness between the range of 0.5 mm and 2.5 mm.

14. A structural support member as set forth in claim 11 further comprising a tensile member disposed between and interconnecting the first portion and the second portion.

15. The method set forth in claim 1 wherein the laminate layer comprises an iron based alloy comprising iron at a level of greater than or equal to 45 atomic percent.

16. The method set forth in claim 15 wherein the laminate layer further includes nickel, boron, and silicon.

17. The method of claim 1 wherein the laminate layer comprises an iron based alloy comprising iron in the range of 45 atomic percent to 71 atomic percent, nickel in the range of 4 atomic percent to 17.5 atomic percent, boron in the range of 11 atomic percent to 16 atomic percent, silicon in the range of 0.3 atomic percent to 4.0 atomic percent, and optionally chromium in the range of 0.1 atomic percent to 19 atomic percent.

18. The method set forth in claim 1 wherein the laminate layer has an elongation in the range of 0.4 percent to 5.5 percent.

19. The method set forth in claim 1 wherein the second portion and the laminate layer have a thickness in the range of 0.5 mm to 2.5 mm.

20. The method set forth in claim 1 wherein said ultra high strength material exhibits an ultimate tensile strength in the range of 0.4 GPa to 3.90 GPa.

21. The method set forth in claim 8 wherein the laminate layer comprises an iron based alloy comprising iron at a level of greater than or equal to 45 atomic percent.

22. The method set forth in claim 8 wherein the laminate layer further includes nickel, boron, and silicon.

23. The method set forth in claim 22 wherein the laminate layer comprises an iron based alloy comprising iron in the range of 45 atomic percent to 71 atomic percent, nickel in the range of 4 atomic percent to 17.5 atomic percent, boron in the range of 11 atomic percent to 16 atomic percent, silicon in the range of 0.3 atomic percent to 4.0 atomic percent, and optionally chromium in the range of 0.1 atomic percent to 19 atomic percent.

24. The method set forth in claim 8 wherein the laminate layer has an elongation in the range of 0.4 percent to 5.5 percent.

25. The method set forth in claim 8 wherein the second portion and the laminate layer have a thickness in the range of 0.5 mm to 2.5 mm.

26. The method set forth in claim 8 wherein said ultra high strength material exhibits an ultimate tensile strength in the range of 0.4 GPa to 3.90 GPa.

27. The structural support of claim 11 wherein the laminate layer comprises an iron based alloy comprising iron at a level of greater than or equal to 45 atomic percent.

28. The structural support of claim 22 wherein the laminate layer further includes nickel, boron, and silicon.

29. The structural support member of claim 11 wherein the laminate layer comprises an iron based alloy comprising iron in the range of 45 atomic percent to 71 atomic percent, nickel in the range of 4 atomic percent to 17.5 atomic percent, boron in the range of 11 atomic percent to 16 atomic percent, silicon in the range of 0.3 atomic percent to 4.0 atomic percent, and optionally chromium in the range of 0.1 atomic percent to 19 atomic percent.

30. The structural support member of claim 11 wherein the laminate layer has an elongation in the range of 0.4 percent to 5.5 percent.

31. The structural support member of claim 11 wherein said ultra high strength material exhibits an ultimate tensile strength in the range of 0.4 GPa to 3.90 GPa.

\* \* \* \* \*